(12) United States Patent
Topping

(10) Patent No.: US 6,654,484 B2
(45) Date of Patent: *Nov. 25, 2003

(54) SECURE CONTROL DATA ENTRY SYSTEM

(76) Inventor: Catherine Topping, 34 Baveney Road, St. Johns, Worcester (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/558,828

(22) Filed: Apr. 26, 2000

(65) Prior Publication Data

US 2002/0181747 A1 Dec. 5, 2002

(30) Foreign Application Priority Data

Oct. 28, 1999 (GB) ............................................. 9925587
Dec. 17, 1999 (GB) ............................................. 9929757

(51) Int. Cl.[7] .............................................. G06K 91/00
(52) U.S. Cl. ...................... 382/124; 340/552; 340/583
(58) Field of Search ................................ 382/115, 124; 340/5.52, 5.83

(56) References Cited

U.S. PATENT DOCUMENTS

| | | | |
|---|---|---|---|
| 5,420,936 A | * | 5/1995 | Fitzpatrick et al. ......... 382/124 |
| 5,603,179 A | | 2/1997 | Adams |
| 5,764,222 A | * | 6/1998 | Shieh ........................ 42/70.08 |
| 5,821,252 A | | 9/1998 | Bowker et al. |
| 5,872,559 A | * | 2/1999 | Shieh ......................... 345/157 |
| 6,193,153 B1 | * | 2/2001 | Lambert ..................... 345/173 |
| 6,393,139 B1 | * | 5/2002 | Lin et al. .................... 382/124 |

FOREIGN PATENT DOCUMENTS

| | | |
|---|---|---|
| EP | 0949578 | 10/1999 |
| FR | 2585153 | 1/1987 |
| GB | 2314661 | 6/1996 |
| WO | 9840962 | 9/1998 |

* cited by examiner

*Primary Examiner*—Jon Chang
*Assistant Examiner*—Charles Kim
(74) *Attorney, Agent, or Firm*—Andrus, Sceales, Starke & Sawall

(57) ABSTRACT

An identification system for use in controlling the operation of a device comprises comparing fingerprint data with stored data to identify both an individual and which of the individual's fingerprints has been input, and using the identity of the individual and the finger in controlling the operation of the device.

2 Claims, 3 Drawing Sheets

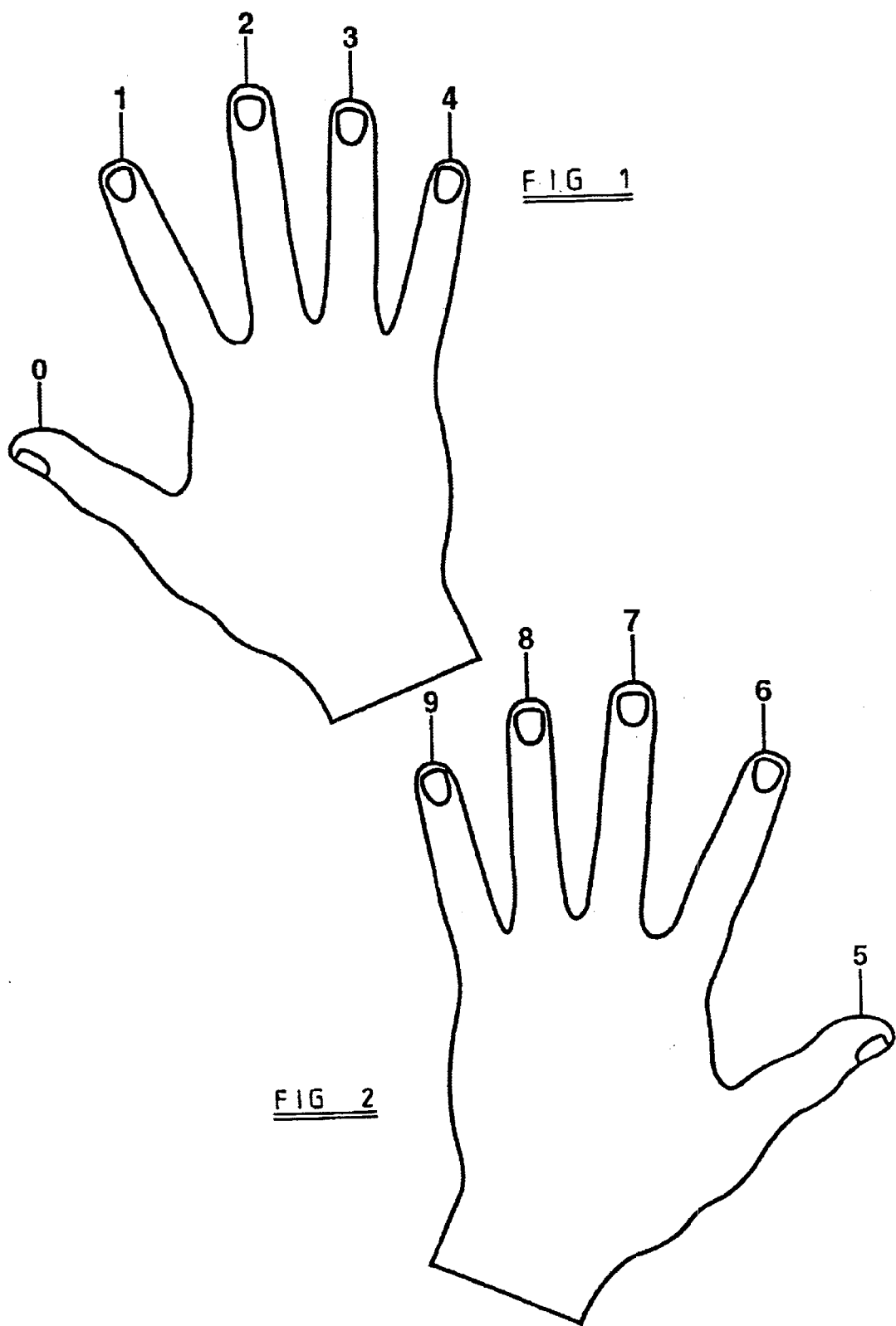

SECURE CONTROL DATA ENTRY SYSTEM

BACKGROUND OF THE INVENTION

This invention relates to an identification system for use in identifying an individual.

It is well known to use fingerprints in the identification of people. For example fingerprint records have been used by the police around the world to identify individuals. It is also known to use electronic fingerprint recognition systems to control access rights in computer systems, the computer holding a database of fingerprints of authorised users and only permitting use of the computer or certain operations of the computer by individuals whose fingerprint match one of the fingerprints stored in the database. Typically, only one fingerprint of each authorised user is stored.

SUMMARY OF THE INVENTION

The present invention is intended to provide an identification system having an improved level of security.

According to the invention there is provided an identification system for use in controlling the operation of a device comprising sensing the fingerprint of a finger of an individual, comparing the fingerprint with a series of stored fingerprints to identify both the individual and which of the individual's fingerprints has been sensed, and using this information in controlling the operation of the device.

One possible use of the invention is in controlling the operation of a television. Each television channel is allocated to one of a user's fingers, and the television channel to be viewed may be selected by placing the appropriate one of an individual's fingers onto a fingerprint reader. For example, channel one may be selected using one finger, channel two being selected using another finger. Where there are a large number of channels, then these may be selected by using appropriate fingers in sequence. As both the individual and the finger being used are identified, the television may be programmed to restrict access to some channels to a restricted group of authorised viewers, or alternatively some other settings of the television may be set to those preferred by that individual.

An alternative use for the invention is in logging on to a computer system with a range of access rights. As the system identifies both the user and which finger is being used, the system may be set up so that the use of one finger gives the individual a restricted level of access, the use of a different finger gives additional access rights, and the use of a third finger gives further access rights. Again, as the identity of the user is checked, access to certain areas can be restricted to smaller groups of authorised users.

In a further possible application, the input fingerprint data could be transmitted to a remote location where the identification process is performed and a device controlled in response to the fingerprint data being recognised. The fingerprint data would then be acting, in effect, as an electronic signature. Clearly, if the device at the remote location requires several fingerprints to be entered in a particular sequence, then the system is of a good level of security.

Another use for the invention is in a trigger mechanism for a gun. The system would only permit firing of the gun by an authorised individual. Further, the firing action of the gun may be controlled depending upon which of the individual's finger is placed upon the trigger. Thus, when used at close range or when used to stun rather than injure, a different finger may be used to that used when the gun is to be used to injure, resulting in the gun operating at a reduced power level. The system could also be used with other devices incorporating switches, the function of the switch depending upon which individual is using the switch and which of the individuals fingers is being used.

The system could alternatively be used in an access system having a duress warning system. In normal use, one of the user's fingers is used to gain access, for example to a computer system, the use of another of the user's fingers also gaining access, possibly at a restricted level, and also triggering an alarm or warning that the user has been forced to use the system under duress.

Another use for the system is where devices must be operated, either in areas of poor light or by the blind In such cases, the use of a traditional key pad or control panel having buttons may be impractical, and instead the device may be operated by sensing which of an individuals fingers has been placed on a fingerprint reader, and associating a function with each finger. Alternatively a number may be associated with each finger thereby permitting numbers to be entered. Clearly, number codes or large numbers may be input by placing the appropriate fingers onto the fingerprint reader in sequence.

The system may require two or more fingerprints to be input in sequence, the system determining whether the fingerprints have been input in a correct sequence and controlling operation of the device accordingly. In such an arrangement access rights are only granted when the fingerprints have been input in the correct sequence, thereby introducing an additional level of security.

Another use for the invention is for text entry on keyboards having only a small number of keys, for example on mobile telephones where names or text messages are to be entered for storage in an address book or for transmitting in the form of a text message, E-mail, or facsimile transmission. Each key may have several functions associated therewith, the function to be performed depending upon which of an individual's fingers are used to depress or operate the key. Although referred to herein as "keys", it will be appreciated that each "key" may simply comprise part of a larger sensor area divided to define a plurality of "keys".

It will be appreciated that in all of the arrangements mentioned hereinbefore, as the system must identify which of an operator's fingers is being used to operate the device, and as fingerprints provide an accurate technique for identifying individuals, the system automatically identifies the individual operating the device.

The invention will further be described, by way of example, with reference to the accompanying drawings, in which:

BRIEF DESCRIPTION OF THE DRAWINGS

FIGS. 1 and 2 are views indicating possible codes associated with the fingers of a user's hands;

DETAILED DESCRIPTION OF THE INVENTION

Figure 3:
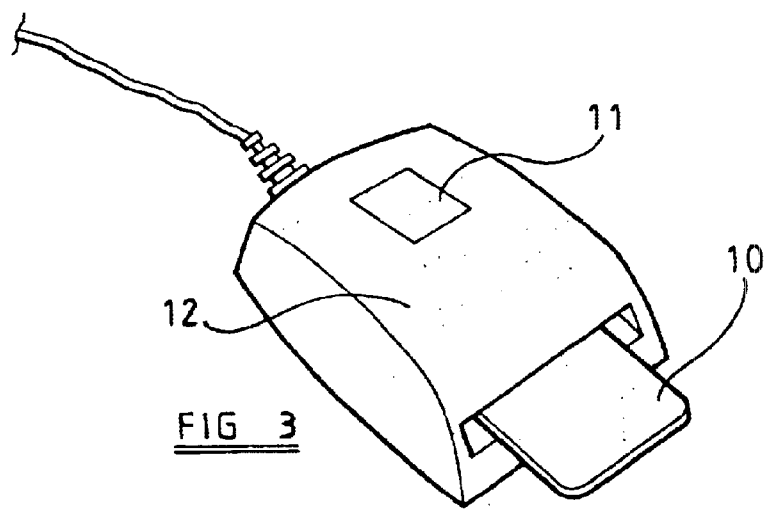
FIG. 3 is a view of a fingerprint reader suitable for use with the invention.

As described hereinbefore, the invention is suitable for use in a wide range of applications. One possible application is in the inputting of numeric codes. As illustrated in FIGS. 1 and 2, an individual's fingers have been allocated the digits 0 to 9. The fingerprints of all of the individual's fingers have been stored upon a smart card 10 (as illustrated in FIG. 3), or within a computer memory using a suitable fingerprint reader and an appropriate recording device.

In use, when the individual wishes to input a numeric code, he simply places the appropriate ones of his fingers, in sequence, onto the sensor 11 of a fingerprint reader 12. In FIG. 3, the fingerprint reader 12 comprises a Biometrics Research Precise 100 sc ID, but it will be appreciated that other readers could be used. The reader 12 is used, in conjunction with the stored fingerprint data, to identify the individual and to identify which of his fingers have been placed upon the sensor 11. Provided the reader or a device connected to the reader 12 is programmed in such a manner as to associate the correct digit with each finger, then the information input through the reader 12 can be used to denote a numeric code.

By way of example, where the code 284 is to be entered, then the fingerprints of right hand finger 2, left hand finger 4 and then right hand finger 4 should be placed upon the sensor 11 of the reader 12 in sequence.

If desired, the identification process may be performed at a remote location and used to control a device at that location, the input fingerprint data acting, in effect, as an electronic signature. The invention may be suitable for use in electronic banking systems for example.

As both the identity of the individual and the sequence in which the digits of the code are entered are recognised by the identification system, the system provides an identification system having an improved level of security over both systems that simply require the input of an identification number and over systems that use a single fingerprint to identify an individual. Although in the description hereinbefore a numeric code is input, it will be appreciated that this need not be the case, and that all that is required is that the fingerprints are input in the correct sequence. However, the allocation of numeric digits to the fingers may be advantageous, particularly where the device requires the input of numeric information, in that subsequent operation of the device may be achieved without providing a numeric key pad. The invention may, therefore, be suitable for use in, for example, an automatic bank teller machine. The avoidance of the provision of a numeric key pad may be advantageous in that the cost of the device can be reduced, the risk of damage may be reduced and operation of the device in areas of poor lighting or by the visually impaired may be simplified as individual keys do not need to be depressed but rather a fingerprint input on a reader which may be of relative large dimensions.

The advantages mentioned above with regard to the avoidance of the provision of a key pad, use in areas of poor lighting or where the device is to be used by the visually impaired may be applicable in a wide range of other devices.

Although in the description hereinbefore, a number of fingerprints are input in a predetermined sequence in order to gain control of a device, this need not be the case. Instead, control of a device may be achieved by inputting a single fingerprint, the device being controlled in accordance with which of the individuals fingerprints are input. By way of example, instead of typing a password to log onto a computer system the identification system may be used. The system may be set up so that inputting of one fingerprint permits use of a local computer. Subsequent input of another fingerprint may allow use of a local area network and subsequent input of another fingerprint may permit internet access. In all three cases, the identity of the individual is determined and access denied if the individual is not recognised or not permitted the particular level of access.

The system may alternatively be used to provide a warning in the event that a user is being forced to log onto a computer system or access other rights under duress. The system could operate in such a manner that placing one finger onto a fingerprint reader allows the user normal access, the use of another finger granting access rights, possibly at a reduced level, and also triggering an alarm or warning that the access rights have been obtained under duress. It is thought that a user is more likely to trigger the warning under such circumstances using the system of the invention than to trigger a warning using a conventional second password technique.

In an alternative application, the system could be used to control the operation of a television, controlling which channel is selected. Each television channel is allocated to a finger and the channel selected by inputting that finger's print. As the identity of the individual selecting the channel is determined, access to certain television channels may be restricted to only some of the authorised users of the television. Where the number of television channels exceeds ten, then higher numbers may be input by inputting fingerprints in sequence as described hereinbefore.

Figure 4:
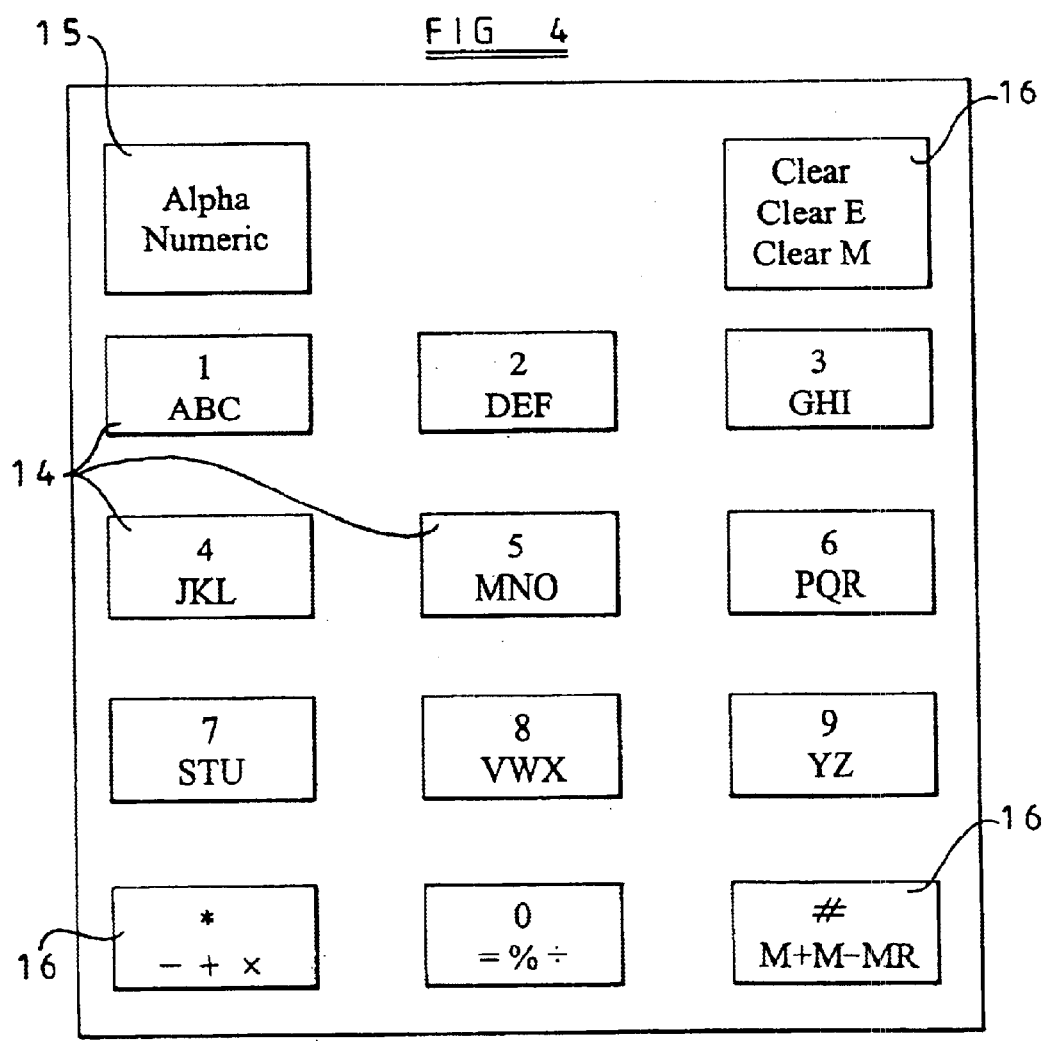
FIG. 4 is a view of a key pad suitable for use with the invention.
Figure 5:
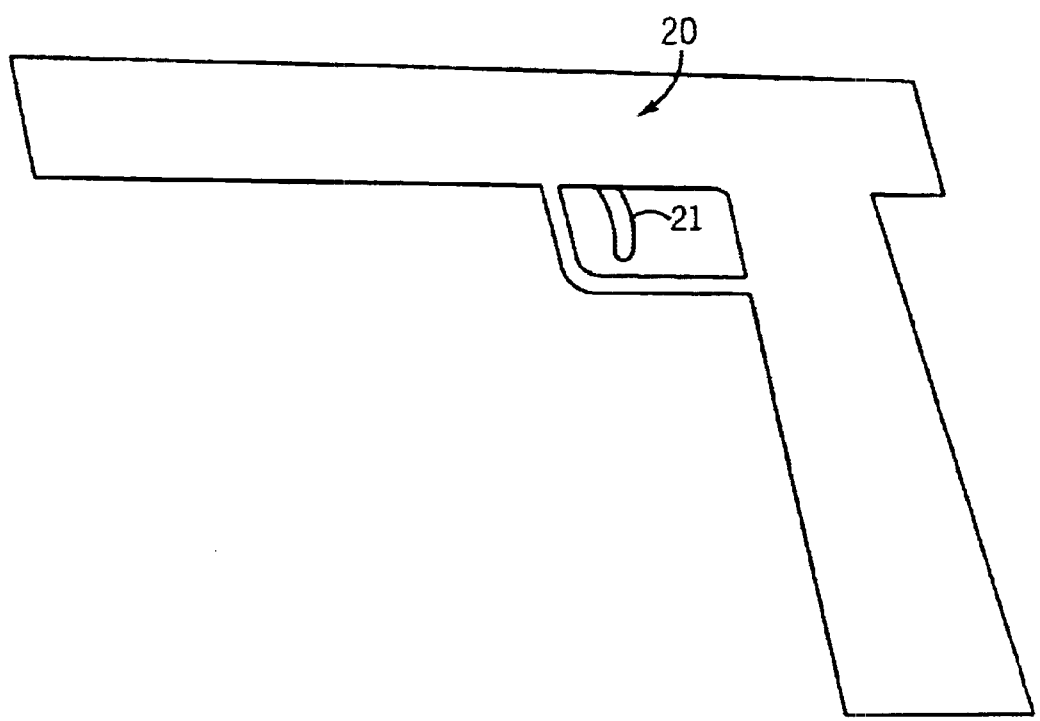
FIG. 5 is a view of a gun suitable for use with the invention.

A further use of the invention is in restricting the use of a gun 20 (see FIG. 5) and controlling the operation of the gun 20. This may be achieved by associating a fingerprint reader with the trigger 21 of the gun 20, and controlling the trigger 21 in such a manner as to ensure that the gun 20 can only be fired when an authorised user's fingerprint is sensed, detection of any other fingerprint disabling the gun. Clearly, the use of the invention reduces the risk of injury arising from accidental operation of the gun and prevents use of the gun other Another use for the invention will be described with reference to FIG. 4. FIG. 4 illustrates, diagrammatically, the key pad of a mobile telephone. The key pad has ten number entry keys or key pad areas 14. Each key comprises a fingerprint reader. Each key 14 has a numeric digit associated therewith. Additionally, some of the keys 14 have letters associated therewith. For example, the key 14 associated with the digit 1 also has the letters A, B and C associated therewith. The key pad further has a mode selection key 15 which is used to determine whether the key pad is to operate in text entry mode or in a number entry mode. The key pad also includes several other keys 16 which can be used to perform a range of functions, for example, to permit a range of symbols to be entered or to permit the key pad to be operated in a calculator mode. The symbols which could be input include brackets, mathematical symbols and symbols used where the text is to be input other than in the English language. As illustrated in FIG. 4, some of the symbols may also be associated with the key 14 associated with the digit O.

In use, when operating in the number entry mode, the key pad is used in the normal manner. In order to enter text, the mode selection key 15 is operated. Once in the text entry mode, each key 14 has several possible functions and which function is performed depends upon which finger is used to operate the key. For example, if it is desired to input a letter A, then the key 14 associated with digit 1 is operated using the index finger. To enter a letter B, rather than use the index finger, the middle finger is used.

After text entry has been completed, or if a number needs to be inserted, then the mode selection key 15 is operated to revert to number entry mode.

The key pad may be made up of a plurality of separate discrete fingerprint sensors, each sensor constituting one of the keys 14 as mentioned above. Alternatively, a single large fingerprint sensor may be used, the sensor being divided into a plurality of regions or zones, each zone forming one of the keys.

The use of the invention in this manner is advantageous in that text entry on a key pad having few keys can be achieved in a convenient manner. Further, as the individual operating the device is identified, use by an unauthorised individual can be prevented.

Although described in relation to a mobile telephone, the invention is also applicable to other devices, for example electronic organisers.

I claim:

1. A secure data entry system comprising assigning a data character to each of a plurality of an individual's fingers, inputting fingerprint data relating to a fingerprint pattern of the individual into a device using a fingerprint reader, comparing the fingerprint data with stored fingerprint data to identify the individual whose fingerprint data has been input and to identify to which of the individual's fingers the fingerprint data relates to determine which data character has been input, wherein the device includes a plurality of sensor regions, each of the sensor regions having a plurality of data characters associated therewith, the data character input being dependent upon both the identity of the finger used to input the fingerprint data into the device and which sensor region is used to input the fingerprint data.

2. A system as claimed in claim 1, wherein the device is adapted to permit text entry, a letter entered depending upon which finger is used and which sensor region is used to sense the fingerprint.

* * * * *